United States Patent
Scouller et al.

(10) Patent No.: US 8,271,719 B2
(45) Date of Patent: Sep. 18, 2012

(54) NON-VOLATILE MEMORY CONTROLLER DEVICE AND METHOD THEREFOR

(75) Inventors: Ross S. Scouller, Austin, TX (US); Daniel L. Andre, Austin, TX (US); Stephen F. McGinty, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 344 days.

(21) Appl. No.: 12/608,541

(22) Filed: Oct. 29, 2009

(65) Prior Publication Data

US 2011/0107009 A1  May 5, 2011

(51) Int. Cl.
*G06F 12/00* (2006.01)
(52) U.S. Cl. .................... 711/103; 365/185.33
(58) Field of Classification Search .................. 711/103; 365/185.33
See application file for complete search history.

(56) References Cited

U.S. PATENT DOCUMENTS

| | | | |
|---|---|---|---|
| 6,904,400 B1 | 6/2005 | Peri et al. | |
| 7,058,755 B2 | 6/2006 | Nallapa | |
| 7,406,558 B2 | 7/2008 | Przybylek | |
| 7,669,004 B2* | 2/2010 | Lin et al. | 711/103 |
| 2006/0179211 A1* | 8/2006 | Aasheim et al. | 711/103 |
| 2009/0109786 A1* | 4/2009 | Ye et al. | 365/228 |
| 2010/0100664 A1* | 4/2010 | Shimozono | 711/103 |
| 2010/0191901 A1* | 7/2010 | Toyama | 711/103 |

* cited by examiner

*Primary Examiner* — Hashem Farrokh

(57) ABSTRACT

A method of storing information at a non-volatile memory includes storing a status bit prior to storing data at the memory. A second status bit is stored after storing of the data. Because the storage of data is interleaved with the storage of the status bits, a brownout or other corrupting event during storage of the data will likely result in a failure to store the second status bit. Therefore, the first and second status bits can be compared to determine if the data was properly stored at the non-volatile memory.

20 Claims, 7 Drawing Sheets

NON-VOLATILE MEMORY CONTROLLER DEVICE AND METHOD THEREFOR

BACKGROUND

1. Field of the Disclosure

The present disclosure is related generally to data processing devices, and more particularly to data processing devices having non-volatile memory devices.

2. Description of the Related Art

An electronic device can employ a dedicated electrically erasable programmable read-only memory (EEPROM) to store information, such as configuration information, that is to be retained when power is not supplied to the device. However, some dedicated EEPROMs can be undesirably expensive or difficult to manufacture. Accordingly, some devices emulate an EEPROM using a portion of a flash memory to mirror information stored at a RAM, so that the stored information is maintained when the device is not powered. The remaining portion of the flash memory is used for normal operations of the device. By using a portion of existing flash memory used for other operations, rather than a dedicated EEPROM, the cost of the electronic device can be reduced. However, power fluctuations and asynchronous resets (referred to as "brown-outs) at the device can cause corruption of the mirrored information at the flash memory.

BRIEF DESCRIPTION OF THE DRAWINGS

The present disclosure may be better understood, and its numerous features and advantages made apparent to those skilled in the art by referencing the accompanying drawings.

DETAILED DESCRIPTION

A method of storing information at a non-volatile memory includes storing a status bit prior to storing data at the memory. A second status bit is stored after storing of the data. Because the storage of data is interleaved with the storage of the status bits, a brownout or other corrupting event during storage of the data will likely result in a failure to store the second status bit. Therefore, the first and second status bits can be compared to determine if the data was properly stored at the non-volatile memory.

Figure 1:
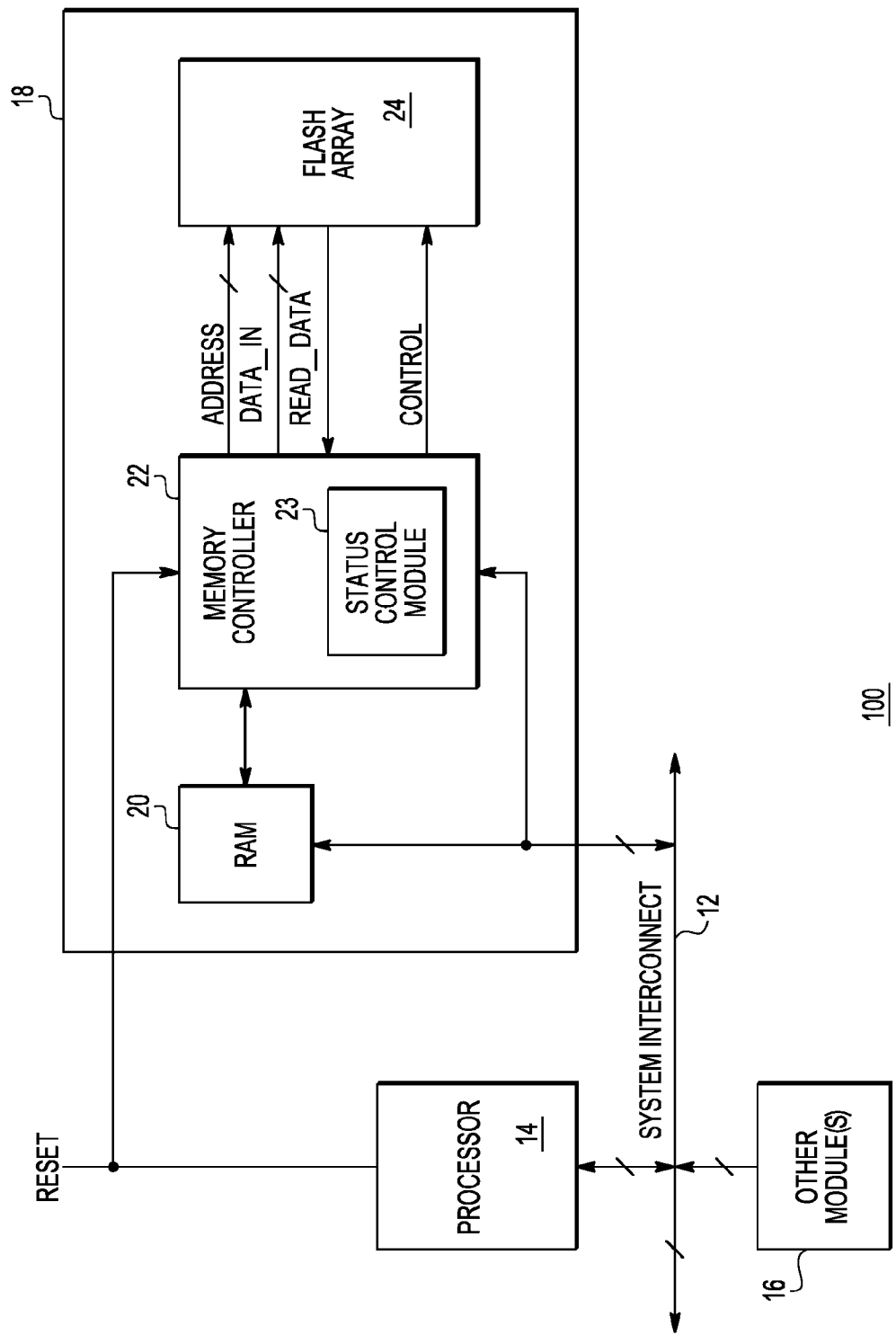
FIG. 1 is a block diagram illustrating a data processing device that includes an EEPROM device in accordance with a specific embodiment of the present disclosure.

FIG. 1 is a block diagram illustrating a data processing device 100 that includes an EEPROM device in accordance with a specific embodiment of the present disclosure. Data processing device 100 includes a processor 14, other module (s) 16 (if any), a system interconnect 12, and an EEPROM device 18. Each of processor 14, other module(s) 16, and EEPROM device 18 are connected to system interconnect 12. EEPROM device 18 includes a random access memory (RAM) 20, a memory controller 22, and a flash array 24. In other embodiments, flash array 24 can be another form of non-volatile memory, such as magneto-resistive random access memory (MRAM). Memory controller 22 includes a status control module 23. Memory controller 22 is connected to a volatile memory, illustrated as RAM 20, and to flash array 24 via nodes labeled ADDRESS, DATA_IN, READ_DATA, STATUS, and CONTROL. RAM 20 and memory controller 22 are connected to system interconnect 12. A reset signal is provided to processor 14 and memory controller 22. The reset signal may be, for example, a global reset signal for data processing device 100. For the purpose of illustration, EEPROM device 18 is described as a discrete device, but EEPROM device 18 can be included at an integrated circuit that includes other components of data processing device 100, such as processor 14.

Flash array 24 is a non-volatile memory having multiple memory locations. In an embodiment, flash array 24 is configured so that each memory location of the array, corresponding to a bit of information, can have one of two digital states. Prior to any information being written to the flash array 24, each memory location is in a common, default state. For purposes of discussion, it is assumed that the default state is associated with a logic value "1." The flash array 24 is further configured such that each memory location can be individually programmed to change the location from a default state to a programmed state. For purposes of discussion, it is assumed that the programmed state is associated with a logic value "0." In addition, in the illustrated embodiment it is assumed that the flash array 24 is configured so that a memory location cannot be individually returned from a programmed state to the default state. Instead, the flash array 24 is configured so that a memory location can only be returned to the default state from the programmed state by placing each memory location of the associated sector in the default state. Returning each memory location of a sector to the default state is referred to as erasing the sector. In an embodiment, flash array 24 can include NAND flash, NOR flash, or another type of non-volatile memory.

Memory controller 22 is configured to store information at flash array 24. In particular, flash array 24 is configured to store information in records, where each record includes data information representing the data associated with the record, address information indicating an address associated with the record, and status information indicating a status of the associated data information. Memory controller 22 writes information to the flash array 24 by providing the address information via node ADDRESS, the data information via node DATA_IN, and configuring control information at node CONTROL. Similarly, memory controller 22 can read information stored at flash array 24 by providing an address at node ADDRESS and configuring control information at node CONTROL. In response, flash array 24 provides the data information of the record indicated by the address via node READ_DATA. Memory controller 22 can include a data processing device such as a microprocessor, a microcontroller, logic devices, or a combination thereof that is configured to administer the procedures associated with memory controller 22.

During operation, processor 14 or another master device can communicate directly with RAM 20 via system interconnect 12 to store and retrieve information at RAM 20 via an access request. For purposes of discussion, an access request to store information at the RAM 20 is referred to as a "write access" and an access request to retrieve information stored at the RAM 20 is referred to as a "read access." An access request includes an access address corresponding to a location at RAM 20, and, in the case of a write access, data information that is to be written to the provided address. In response to a write access, RAM 20 stores the received write data at a memory location associated with the received write address. In response to a read access, RAM 20 retrieves the data stored at the memory location indicated by the address and provides the data via system interconnect 12.

In the case of a write access, memory controller 22 can also store the data associated with the write access at flash array 24. The data will thus be preserved in the event of a power fluctuation (including a power loss) or reset event at the data processing device 100. To illustrate, in response to a write request, memory controller 22 determines whether the data associated with the write request is different than the data stored at the memory location of the RAM 20 indicated by the address associated with the write request. If so, memory controller 22 stores both the address and the data associated with the write request at a record at flash array 24.

Because memory locations of flash array 24 (and therefore records of flash array 24) cannot be individually erased, memory controller 22 can generate a new record for each write access that results in modification of data stored at the RAM 20. More than one record can therefore be associated with a particular memory location of RAM 20, with the most recently created record associated with a particular memory address storing the most up-to-date data for that address. For purposes of discussion, the most up-to-date data associated with an address is referred to herein as "valid data," while data associated with an address of RAM 20 that has been replaced by newer data is referred to as "invalid data." In an embodiment, memory controller 22 is configured to set the status bits for each record at flash array 24 to indicate whether each record stores valid data or invalid data.

To illustrate, in response to a write access that modifies data stored at a memory location of RAM 20, memory controller 22 determines whether a record associated with that address is stored at the flash array 24. If not, memory controller 22 creates a new record at flash array 24, and stores the data and address associated with the write access at the new record. Memory controller 22 can also store status bits associated with the new record to indicate that the new record stores valid data. If memory controller 22 finds a record already associated with the address at flash array 24, memory controller 22 can set status bits associated with the record to indicate that the record stores invalid data. Memory controller 22 further creates a new record at flash array 24 to store the data and address associated with the write access. In an embodiment, memory controller can stored status bits for the new record to indicate the new record stores valid data.

In another embodiment, a record at flash array 24 can store data associated with multiple write accesses to the address associated with the record. For example, a record at flash array 24 can be configured to store two bytes of data associated with an address. In response to a first one-byte write access to the address (i.e. a request to write one-byte of data to memory location at RAM 20 associated with the address), memory controller 22 creates a new record and stores the data associated with the write access at a first of two data bytes of the record, and stores status bits indicating the data stored at the first byte is valid data. In response to a subsequent second one-byte write access to the address, memory controller 22 stores the data associated with the second write access at the second byte of the record. In addition, memory controller 22 stores status bits to indicate the first byte of the record stores invalid data and the second byte of the record stores valid data. In response to a third write access to the address, memory controller 22 creates a new record as described above, and stores status bits to indicate that both bytes of the first record store invalid data.

In the illustrated embodiment of FIG. 1, it is assumed that memory controller 22 creates new records at flash array 24 in a sequential manner whereby each new record is stored at a location logically adjacent and immediately following the location used to store the record created in response to the preceding write access. As data stored at RAM 20 is modified via write accesses, and records corresponding to the modified data are created at flash array 24, the available space to store information at flash array 24 is reduced. In response to determining the amount of space available at flash array 24 is below a defined or programmable threshold, memory controller 22 performs data consolidation and selective data erasure to ensure that there are empty locations, sequential to the most recently updated location, that are available to accommodate new records. The successive creation of new records, consolidation, and erasure is performed in a round-robin manner so that after the last (bottom) location at flash array 24 is filled, the next location to be filled is at the beginning (top) of flash array 24. This technique can be better understood with reference to FIG. 2.

Figure 2:
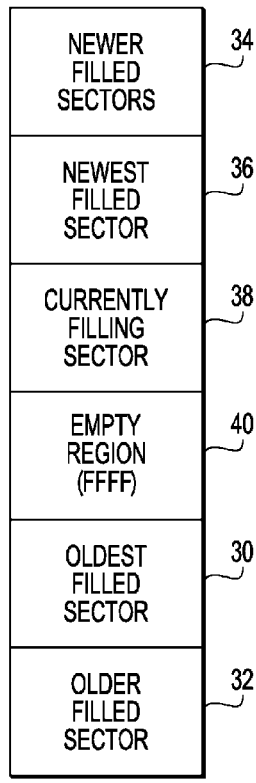
FIG. 2 is a block diagram illustrating the flash array of FIG. 1 according to a specific embodiment of the present disclosure.

FIG. 2 is a block diagram illustrating flash array 24 of FIG. 1 according to a specific embodiment of the present disclosure. FIG. 2 illustrates flash array 24 during operation of EEPROM device 18. In the illustrated embodiment, flash array 24 includes a plurality of sectors, including sectors 30, 32, 34, 36, and 38 (sectors 30-38) wherein a sector is logically contiguous portion of flash array 24. Flash array 24 also includes an empty region 40, which includes one or more empty sectors. An empty sector refers to a sector where all locations of the sector allotted to store records have been erased.

In the illustrated embodiment, sectors 30-38 include an oldest sector 30 (the sector that was least-recently filled), an older sector 32 (the sector that was filled after filling oldest sector 30), newer filled sectors 34 (one or more sectors filled more recently than was older sector 32), a newest-filled sector 36 (the sector that was most recently filled), and a currently filling sector 38. It is assumed that a filled sector, such as filled sectors 30, 32, 34, and 36, includes no empty locations, so that all locations contain either a record or contain status information associated with the sector. It will be appreciated that although a filled sector includes no empty locations, a particular record of a filled sector can have empty space available to store additional data for the address associated with the record. It is further assumed that currently filling sector 38 is the sector which will store the next record created in response to a write access. During operation, in response to determining the number of erased locations at flash array 24 available to store new records is below a threshold, memory controller 22 performs a consolidation operation by reviewing each record at oldest filled sector 30 and copying each valid record found therein to currently filling sector 38. In particular, to copy a record, memory controller 22 performs a write access to create a new record at currently-filling sector 38 and writes the contents of the record being copied to the new record. Once memory controller 22 determines that all valid records have been copied from oldest filled sector 30 to currently filling sector 38, memory controller 22 performs an erase operation to erase oldest filled sector 30. Thus, the consolidation operation frees space for additional records to be stored at flash array 24.

Figure 3:
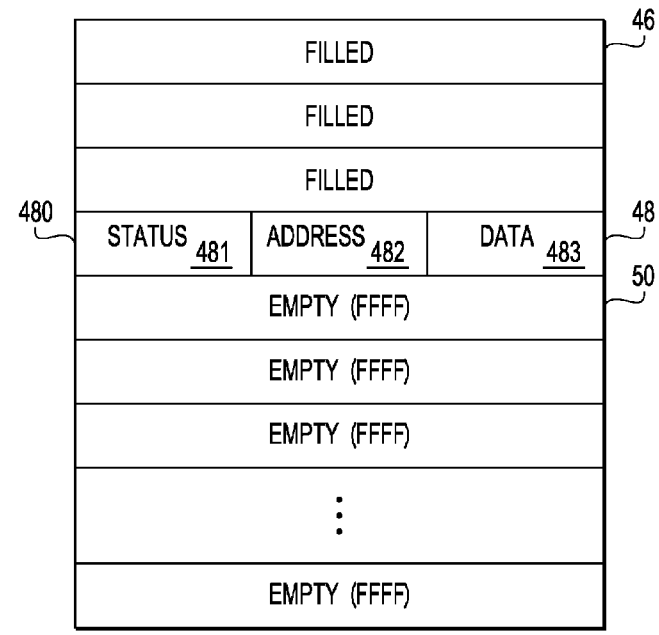
FIG. 3 is a block diagram illustrating a sector of the flash array of FIG. 2 in accordance with a specific embodiment of the present disclosure.

FIG. 3 is a block diagram illustrating currently filling sector 38 of FIG. 2 in accordance with a specific embodiment of the present disclosure. Currently filling sector 38 includes a plurality of locations, each of which can store a record. For the purpose of illustration, currently filling sector 38 includes already-filled locations 46, currently filling location 48, and empty locations 50 (again illustrated parenthetically to include "FFFF," corresponding to the value of data present at locations included at erased sectors). Currently filling sector 38 includes a record 480 having a status information field 481, an address information field 482, and a data information field 483. Currently filling sector 38 may also include one or more locations associated with sector status information (not shown).

During operation, memory controller 22 can monitor system interconnect 12 and determine that a write operation at RAM 20 has occurred, the write operation corresponding to a particular address at RAM 20. Memory controller 22 can further determine whether a record currently stored at flash array 24 is associated with this address. In an embodiment, memory controller 22 may identify more than one record associated with this particular address, in which case, the most recently stored record is determined to be valid, and all other records having this address are determined to be invalid. If memory controller 22 locates a valid record associated with this address, memory controller 22 determines whether the value of the data associated with the valid record matches the value of the data written to RAM 20. If the value of the data associated with the record is the same as the value of the data written to RAM 20, memory controller 22 does not perform a write access, and continues to monitor system interconnect 12 for a subsequent write operation at RAM 20.

If the value of the data associated with the valid record is different from the value updated at RAM 20, memory controller 22 determines whether there is additional space available at the data field of the record to store the corresponding data stored at RAM 20. If so, the existing record is modified to store the corresponding data in the data field of the record. Because an individual memory location at a sector can not be individually erased, the previous value stored at the record is invalidated by programming selected status bits of the record, and the new data value is written to the free space available at the data field of the record. If no space is available in the data field of the record, a new record is created at the next available location (location 48 in the present example) at currently filling sector 38, sequentially adjacent to the most recently filled location. Creation of a record can be better understood with reference to FIG. 4.

Figure 4:
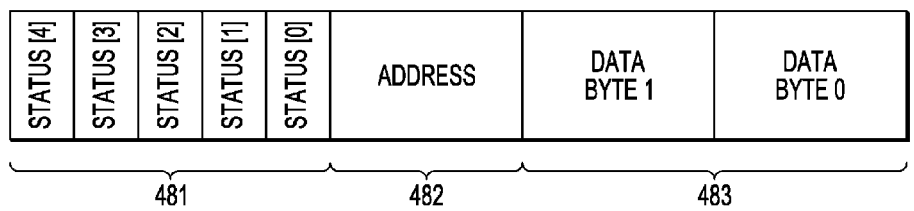
FIG. 4 is a block diagram illustrating a record of the sector of FIG. 3 in accordance with a specific embodiment of the present disclosure.

FIG. 4 is a block diagram illustrating a record 480 stored at currently filling sector 38 of FIG. 3 in accordance with a specific embodiment of the present disclosure. Record 480 includes status information field 481, address information field 482, and data information field 483. For the purpose of illustration, status information field 481 includes locations for five status bits, labeled STATUS[4], STATUS[3], STATUS[2], STATUS[1], and STATUS[0], and data information field 483 includes locations for two data bytes, labeled DATA BYTE 1 and DATA BYTE 0, however another number of status bits or data bytes can be employed without departing from the scope of the present disclosure.

In response to a write access at RAM 20 that requires creation of a new record, memory controller 22 allocates space at flash array 24 for record 480 and writes the address information associated with the write access to address information field 482 and the data associated with the write access to the data information field 482. Memory controller 22 further writes status bits to status information field 481 to indicate that record 480 is a valid record. Two status bits are written in a sequential manner. On subsequent read accesses to record 480, memory controller 22 can determine that the address and data stored at data information field 483 is valid based on the value of the status bits. For example, if both status bits are written, it can be assured that a brownout or other reset event did not occur during writing of the address or data information. Furthermore, if a brownout event had occurred during writing of the second status bit and a subsequent read access to record 480 indicates that the second status bit is not written, the correct value of the first status bit indicates that the address and data information is valid. The sequential writing of the status bits thus reduces the likelihood that a brownout or other reset event will result in invalid data being erroneously determined as valid data by memory controller 22.

In an embodiment, data information field 483 is sufficiently large to store data from more than one write access to the associated memory location of RAM 20. In this embodiment, data information field 483 can be modified in response to an update of the associated memory location if the existing record is associated with the updated address at RAM 20 and if sufficient un-programmed space is available at data information field 483 to store the updated data value. In such a case, the new data value is stored at the un-programmed location of data information field 183. In addition, status information is written to status information field 481 to indicate that record 480 has been modified (one or more data bytes are added or invalidated).

In the event that, in response to the write access, memory controller 22 determines there is no additional space available to store data at data information fields 483, memory controller 22 may store status bits at status information field 481 to indicate that record 480 stores invalid data and can be erased. Memory controller 22 then creates a new record to store the data associated with the write access. Alternatively, memory controller 22 creates a new record to store the data associated with the write access, and the old record is determined to be invalid based on the presence of the new record (that is associated with the same address as the old record) and based on the fact that sectors and sector locations are programmed in a sequential manner.

Figure 5:
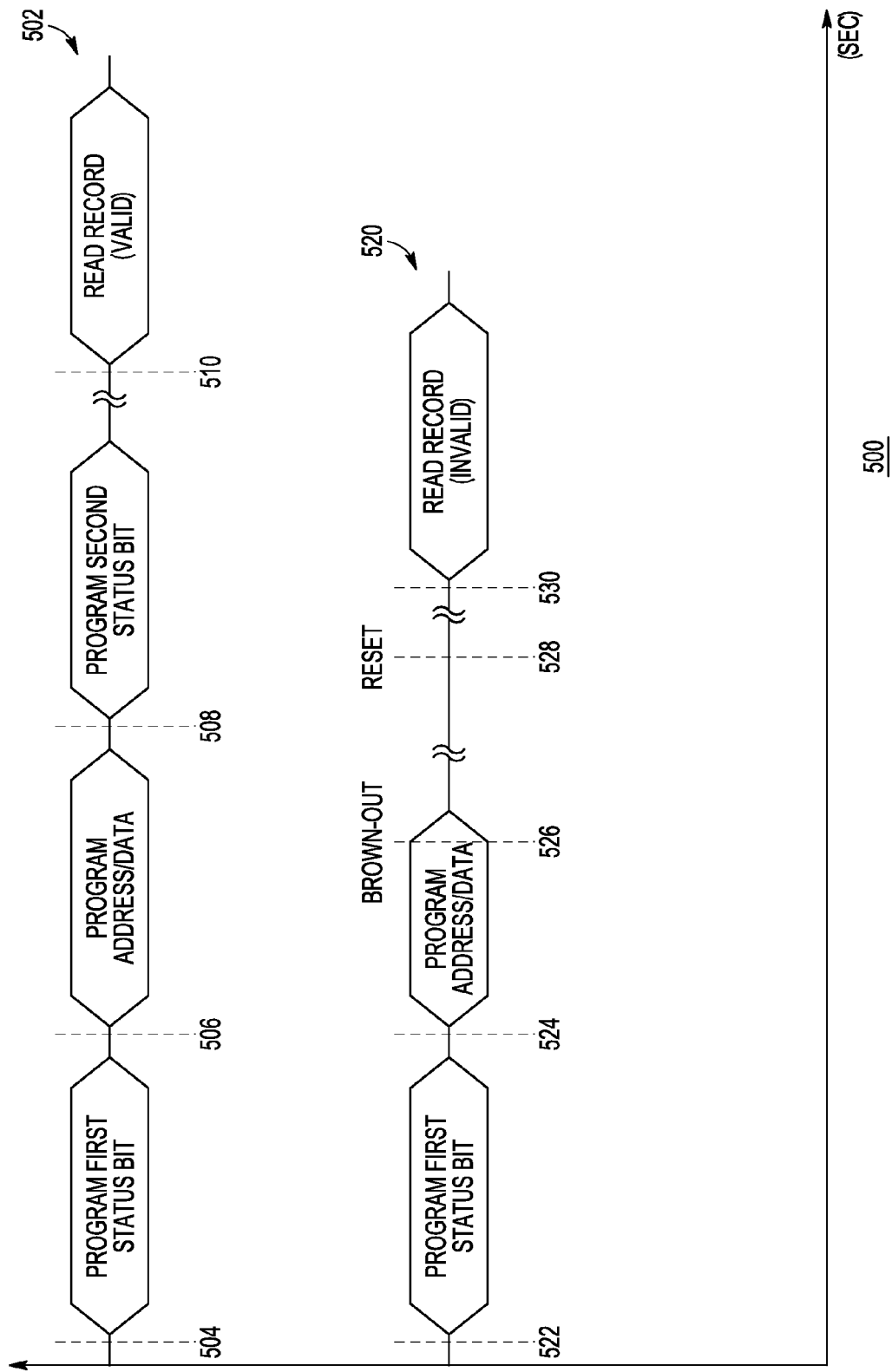
FIG. 5 is a diagram illustrating programming of a record of the flash array of FIG. 2 in accordance with a specific embodiment of the present disclosure.

FIG. 5 is a timing diagram 500 illustrating programming of a record in accordance with a specific embodiment of the present disclosure. Timing diagram 500 illustrates a programming operation 502, which is successfully completed, and a programming operation 520, which is interrupted by a brownout event. Programming operation 502 begins at time 504 where memory controller 22 programs a first status bit, such as STATUS[0] of record 480 at FIG. 4, to indicate the data associated with the record is valid data. Memory controller proceeds to write address and/or data information to the same location at time 504. A second status bit, such as STATUS[1], is programmed at time 508. At a later time 510, memory controller 22 reads this location to determine whether the location contains a valid record. Because programming operation 502 completed successfully, both status bits contain the same value, such as the value zero, and memory controller 22 determines that the record is valid.

Programming operation 520 begins at time 522 where memory controller 22 writes a first status bit, such as STATUS[0] of record 480 at FIG. 4 to indicate the associated data information is valid. Memory controller 22 proceeds to begin writing address and data information to the same location at time 524, but the programming operation is interrupted by a brown-out event, such as a power fluctuation at time 526, so that not all of the address and data information is successfully programmed. Furthermore, because the programming operation was interrupted before the second status bit was written, only one status bit of a corresponding pair of status bits is successfully written. Following the brown-out event, signal RESET is asserted at data processing device 100 at time 528. Memory controller 22 proceeds to restore the contents of RAM 20 based on information stored at flash array 24. At time 530, memory controller 22 reads the location that was being programmed at the time of the brownout event, and determines that the record stored at that location is invalid based on the fact that the value of STATUS[0] and STATUS[1] are different. Therefore, memory controller 22 does not update RAM 20 with information stored at this record. Memory controller 22 can mark the location as invalid, and can furthermore conclude that the previous record associated with that address, having not been invalidated, contains valid data associated with that address.

Figure 6:
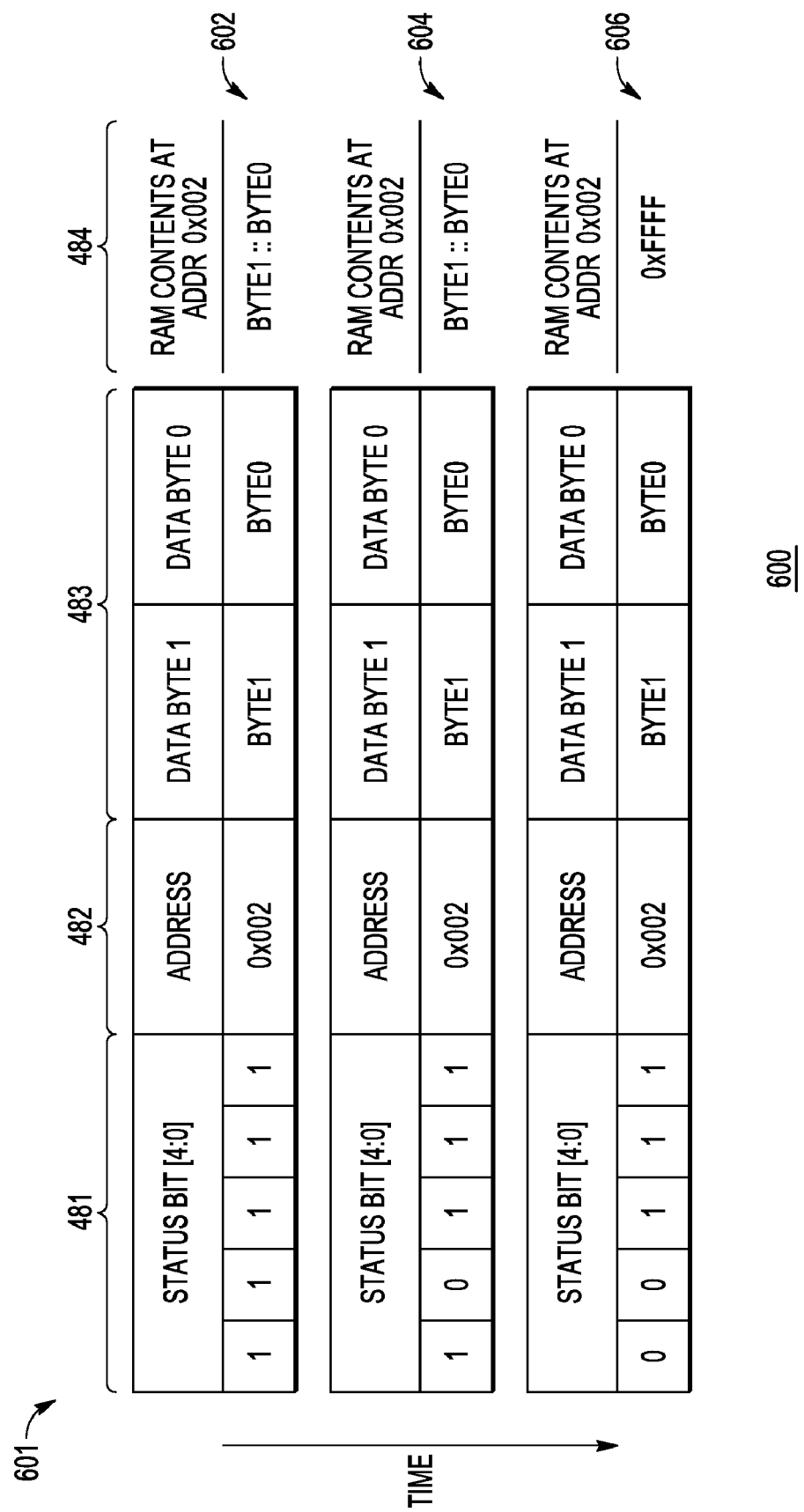
FIG. 6 is a block diagram illustrating an erase operation of an existing record at the flash array of FIG. 1 in accordance with a specific embodiment of the present disclosure.
Figure 7:
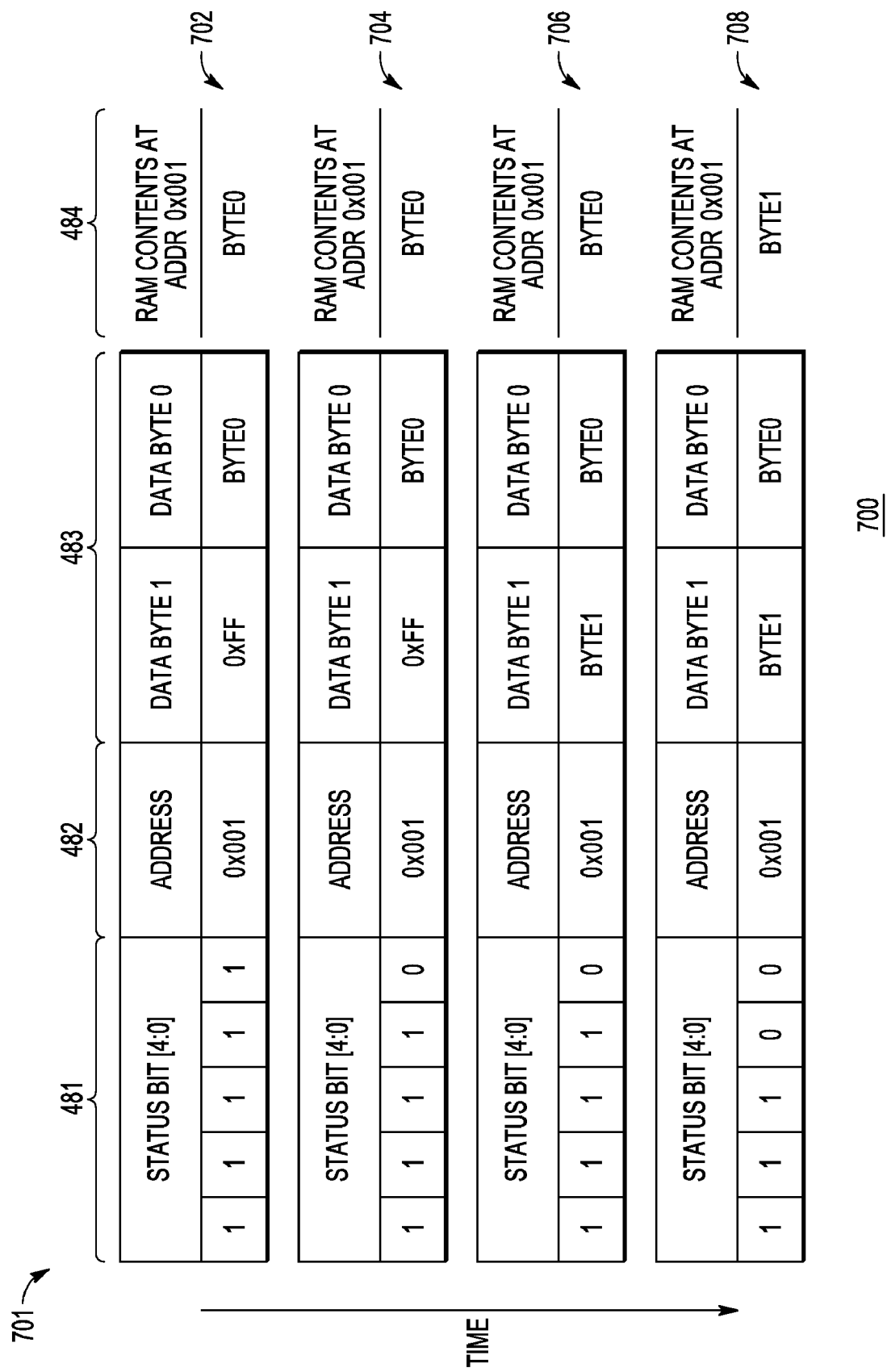
FIG. 7 is a block diagram illustrating a data-modify operation of an existing record at the flash array of FIG. 1 in accordance with a specific embodiment of the present disclosure.
Figure 8:
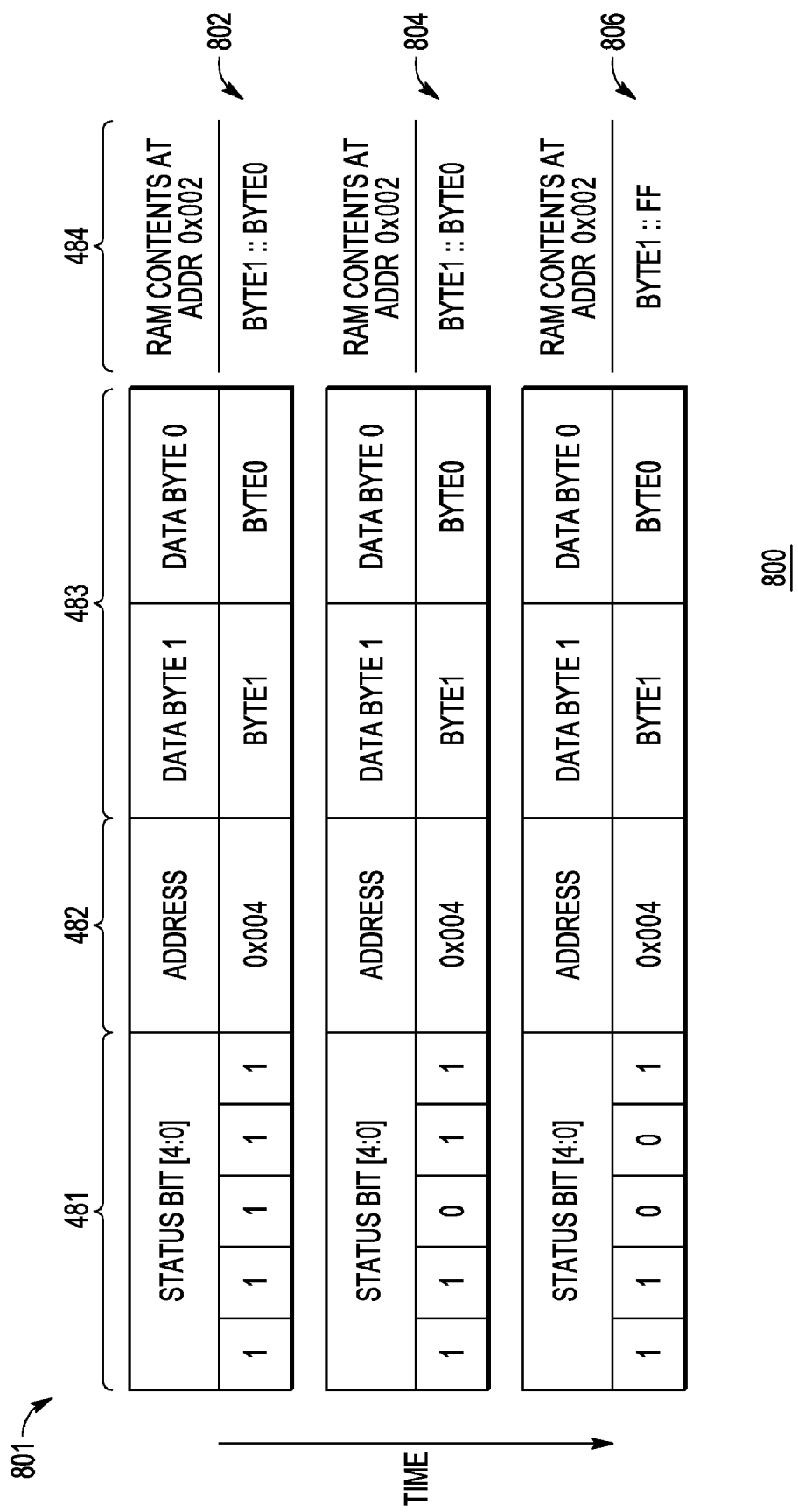
FIG. 8 is a block diagram illustrating a byte-erase operation of an existing record at the flash array of FIG. 1 in accordance with a specific embodiment of the present disclosure.

The invalidation, modification, and creation of a record by memory controller 22 can be better understood with reference to FIGS. 6-8. FIG. 6 is a block diagram illustrating an erase operation 500 whereby an existing record at flash array 24 of FIG. 1 is indicated as storing invalid data in accordance with a specific embodiment of the present disclosure. In the illustrated example, it is assumed that erase operation 600 is performed by memory controller 22 in response to a write access at RAM 20 where a new value of 0xFFFF was written to the address associated with the record. In another embodiment, memory controller 22 may also perform erase operation 500 to indicate that a record is no longer valid after the record is copied to the currently filling sector during a compress operation.

Erase operation 600 is illustrated using three time-successive views of an existing record 601 having a status information field 481 storing five status bits, labeled STATUS BITS[4:0], an address information field 482 storing an address labeled ADDRESS, and a data information field 483 storing a first data byte labeled DATA BYTE 1, and a second data byte labeled DATA BYTE 0. Also illustrated is field 484, which indicates the data value stored at the location of RAM 20 corresponding to the ADDRESS at the indicated time. At time 602, record 601 stores valid data, as indicated by the STATUS BITS[4:3] each having a logic value of "1." In addition, at time 602 address information field 482 stores an address value of 0x002 (hexadecimal 2) and data information field 483 stores two bytes of data, labeled BYTE1 and BYTE0 respectively, which together provide a two-byte word. Field 484 illustrates that the memory location at RAM 20 corresponding to address 0x002 contains the sixteen bit value BYTE1::BYTE0 (the concatenation of the value BYTE1 and the value BYTE0). For the purpose of illustration, status information field 481 includes locations for five status bits, labeled STATUS[4], STATUS[3], STATUS[2], STATUS[1], and STATUS[0], and data information field 483 includes locations for two data bytes, labeled DATA BYTE 1 and DATA BYTE 0, however another number of status bits or data bytes can be employed without departing from the scope of the present disclosure.

Between time 602 and time 604 a write access is received at memory controller 22, which determines that the write access writes new data to address 0x002 at RAM 20. In response, memory controller 22 communicates a request to flash array 24 to write a logic 0 to STATUS BITS[4] at time 604 and communicates a request to write a logic 0 to STATUS BITS[3] at time 606. Further, at time 606 the new value of 0xFFFF has been written to the memory location at RAM 20 corresponding to address 0x002.

During a compression operation or a subsequent write access to the memory location at RAM 20 corresponding to address 0x002, memory controller 22 analyzes record 601 to determine if it stores valid or invalid data. Memory controller 22 does not determine that record 601 stores invalid data unless both STATUS BIT[4] and STATUS BIT[3] have a value of zero, The particular encoding of status information 481 used to indicate the erasure of both bytes of data (or to indicate another way that data information 483 is to be interpreted) is selected for illustration, and another encoding scheme can be selected. It will be appreciated that bit cells associated with data information 483 have not been actually erased since it is assumed for purposes of discussion that data stored at a sector can only be erased in total and not one byte at a time, but instead the data stored at the record is interpreted as invalid based on the state of status information 481.

FIG. 7 is a block diagram illustrating a data-modify operation 700 of a record 701 at flash array 24 of FIG. 1 in accordance with a specific embodiment of the present disclosure. In particular, FIG. 7 illustrates record 701 being updated in response to a change in data stored at a location of RAM 20 corresponding to the record. Record 701 includes a status information field 481 storing five status bits, labeled STATUS BITS[4:0], an address information field 482 storing an address labeled ADDRESS, and a data information field 483 storing a first data byte labeled DATA BYTE 1, and a second data byte labeled DATA BYTE 0. Also illustrated is field 484, which indicates the data value stored at the location of RAM 20 corresponding to the ADDRESS at the indicated time. Data-modify operation 700 is illustrated using four time-successive views of record 701.

At time 702, record 701 stores valid data, as indicated by the STATUS BITS[4:3] each having a logic value of "1." Further, address field 482 stores an address value 0x001 (hexadecimal 1) and data field 482 stores a single byte of data, labeled BYTE0 stored at DATA BYTE 0. DATA BYTE 1 remains un-programmed and is thus available to store updated information. Accordingly, at time 702 DATA BYTE 1 is illustrated to include a value 0xFF corresponding to an erased state. Field 484 at time 702 illustrates that the memory location of RAM 20 corresponding to address 0x001 contains the eight bit value BYTE0.

Between time 702 and 704, a write access is received at memory controller 22, which determines that the write access writes a new byte of data to address 0x001. In response, memory controller 22 determines that DATA BYTE 1 is available to store the new byte, and further determines that the data at DATA BYTE 0 should be indicated as invalid by status bits field 481. Accordingly, memory controller 22 communicates a request to flash array 24 to write a logic 0 to STATUS BITS[0] at time 704. Memory controller 22 further communicates a request to write the data byte associated with the write access to DATA BYTE 1 at time 706. In addition, memory controller 22 communicates a request to flash array 24 to write a logic 0 to STATUS BITS[1] at time 708. Accordingly, the status information and data are stored at record 701 in an interleaved fashion. In the event of a brownout or other interrupting event during writing of the data to DATA BYTE 1, memory controller 22 would not write the logic 0 to STATUS BITS[1]. The resulting disparity between STATUS BITS[0] and STATUS BITS[1] would indicate to memory controller 22 that the data stored at DATA BYTE 1 may not be valid data.

Whereas FIG. 7 illustrates updating a record to associate the record with a new data byte value, data fields at a record can include a greater or a fewer number of bits. For example, a record may include a pair of sixteen bit or thirty-two bit fields and thus allow replacing an existing data word value with a new data word value. Furthermore, a record can include additional data fields. For example, a record can include three data fields and a suitable number of status bits, thereby allowing the record to be updated twice.

For example, after a brownout or other reset event, memory controller 22 can review each record stored at flash array 24, and determine if there is a disparity between STATUS BITS [0] and STATUS BITS[1]. If so, memory controller 22 can determine that DATA BYTE 1 may not store valid data and take appropriate remedial action, such as indication of a memory storage error to processor 14, execute error correction procedures, and the like.

FIG. 8 is a block diagram illustrating a byte-erase operation 800 of a record 801 at flash array 24 of FIG. 1 in accordance with a specific embodiment of the present disclosure. In particular, byte-erase operation 800 illustrates record 801 being modified to indicate that one portion of the data field of the record stores invalid data while another portion of the data field stores valid data. Record 801 includes a status information field 481 storing five status bits, labeled STATUS BITS [4:0], an address information field 482 storing an address labeled ADDRESS, and a data information field 483 storing a first data byte labeled DATA BYTE 1, and a second data byte labeled DATA BYTE 0. Also illustrated is field 484, which indicates the data value stored at the location of RAM 20 corresponding to the ADDRESS at the indicated time. Byte-erase operation 800 is illustrated using three time-successive views of a single record location.

At time 802, record 801 stores valid data, as indicated by the STATUS BITS[4:3] each having a logic value of "1." Further, address field 482 stores an address value 0x004 (hexadecimal 1) and the data field 482 stores two bytes of data, labeled BYTE0 and BYTE 1, stored at DATA BYTE 0 and DATA BYTE 1, respectively. Field 484 at time 602 illustrates that the memory location of RAM 20 corresponding to address 0x001 contains a sixteen bit value determined by the concatenation of the values stored at DATA BYTE 1 and DATA BYTE 0. FIG. 8 illustrates a scenario wherein a location at RAM 20 is updated and a record corresponding to the updated RAM address already exists at flash array 24. In particular, the previous contents of the record included a sixteen bit data word, and the updated value at RAM 20 includes only one byte of the original value stored at the record. Therefore, it is desired to indicate that one byte at the record has been erased.

Record 802 illustrates the record prior to a byte-erase operation, wherein the record is associated with an address 0x004 (hexadecimal 4) and a sixteen-bit data value determined by the concatenation of BYTE1 and BYTE0, stored at DATA BYTE 1 and DATA BYTE 0, respectively. The byte-erase operation illustrated at FIG. 8 shows the procedure for indicating that DATA BYTE 0 has been erased, and begins by programming STATUS BIT[2] to a logic level zero, as illustrated by record 804, and is completed by programming STATUS BIT[1] to a logic level zero, as illustrated by record 806. The final configuration of status information 481 at record 806 results in memory controller 22 interpreting the record to include a single byte value, BYTE1 stored at DATA BYTE 1, and that location DATA BYTE 0 has been erased and is no longer available for use by a later data-modify operation. In an embodiment, a single bit of status information 481 can be programmed to a logic zero level to indicate a single-byte or a double-byte erasure, but the use of a single bit does not provide assurance that a brown-out did not occur during programming of the single status bit, which may result in an erroneous or indefinite value when the status bit is subsequently read.

Figure 9:
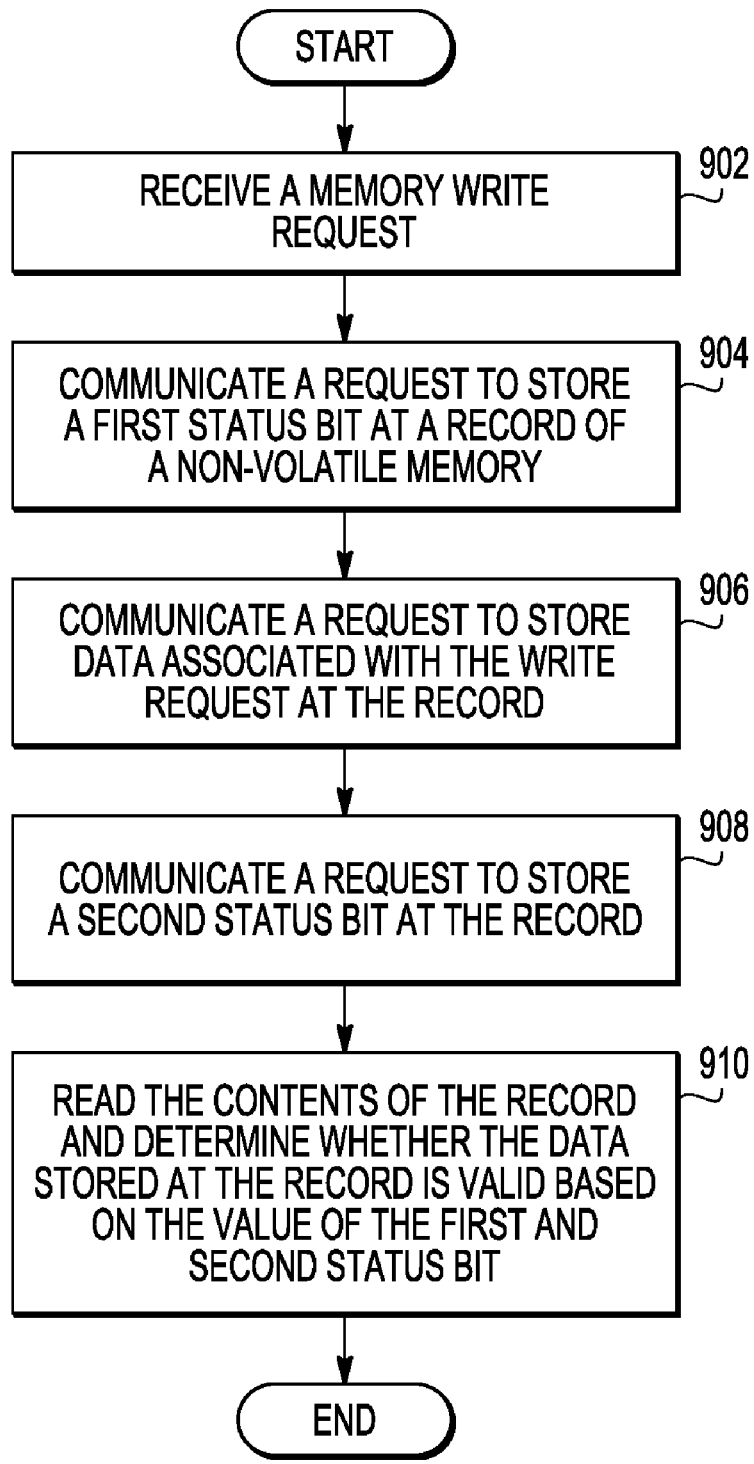
FIG. 9 is flow diagram illustrating a method of storing a record at a flash memory in accordance with a specific embodiment of the present disclosure.

FIG. 9 is flow diagram illustrating a method 900 in accordance with a specific embodiment of the present disclosure. Method 900 begins at block 902 where a memory write request is received at memory controller 22, such as a request to update a value stored at a particular address at RAM 20, is. Memory controller 22 determines that a record associated with this address already exists at flash array 24, and that additional storage space is available at the record to store the updated data value. The flow proceeds to block 904 where memory controller 22 communicates a request to store a first status bit at the record, for example to program a status bit associated with the record to a logic zero level. The flow proceeds to block 906 where memory controller 22 communicates a request to store the updated data value at the record. The flow proceeds to block 908 where memory controller 22 communicates a request to store a second status bit at the record, for example to program another status bit associated with the record to a logic zero level. The flow proceeds to block 910 where memory controller 22 reads the contents of the record and determines if the updated value was successfully stored at the record based on the value of the first and second status bit.

For example, following a brown-out, memory controller 22 is configured to reload RAM 20 with data information stored at flash array 24. If memory controller 22 determines that the record being updated during the brown-out contained only one status bit programmed to a logic zero level, memory controller 22 determines that the updated data value in invalid and the previous data value stored at the record is therefore copied to RAM 20. Alternatively, if memory controller 22 determines that both status bits contain a logic zero value, the updated data stored at the record is copied to RAM 20. As previously described, status information can also be used to designate that one or more bytes of data stored at a record should be interpreted as erased, and therefore should not be copied to RAM 20. Furthermore, memory controller 22 may use status information associated with a record to facilitate a compress operation, where valid data is moved from one sector to a currently filling sector.

Other embodiments, uses, and advantages of the disclosure will be apparent to those skilled in the art from consideration of the specification and practice of the disclosure disclosed herein. The specification and drawings should be considered exemplary only, and the scope of the disclosure is accordingly intended to be limited only by the following claims and equivalents thereof.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed.

Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

For example, techniques disclosed herein can be combined with other techniques to further increase the data storage integrity of EEPROM device 18. In an embodiment, error detection or error correction codes can be included with data stored at a record. In another embodiment, read operations can be performed at flash array 24 using analog reference signals that set a higher standard for sensing logic one and logic zero programmed states at a bit cell being read.

As used herein, programming refers to storing a logic level zero to a bitcell at flash array 24 and erasing refers to storing a logic level one to the bitcell. However, in an another embodiment, programming may refer to storing a logic level one to a bitcell and erasing may refer to storing a logic level zero to the bitcell. A logic level zero may also be referred to as a logic low or a logic level one may also be referred to as a logic high. The term node is used to refer to a single conductor or a plurality of conductors operable to conduct signals, and for simplicity, the name of a node and the signal conducted at the node are used synonymously. For example, node ADDRESS can conduct a signal ADDRESS. The conductors as discussed herein may be illustrated as or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, a plurality of conductors may be replaced with a single conductor that transfers multiple signals serially or in a time multiplexed manner. Likewise, a single conductor carrying multiple signals may be separated out into various different conductors carrying subsets of these signals. Therefore, many options can be used to transfer signals without departing from the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A method comprising:
 receiving a first memory write request to write first data to a volatile memory location;
 in response to receiving the first memory write request:
  storing a first status bit at a first record of a non-volatile memory at a first time;
  storing the first data at the first record of the non-volatile memory at a second time, the second time after the first time; and
  storing a second status bit at the first record of a non-volatile memory at a third time, the third time after the second time.

2. The method of claim 1, further comprising:
 in response to a read request, reading the contents of the first record and determining if the first data at the first record corresponds to data stored at the volatile memory location based on a received value of the first status bit and a received value of the second status bit.

3. The method of claim 2, wherein reading the contents of the first record further comprises reading the contents of the first record and determining the first record does not correspond to data stored at the volatile memory location in response to determining the received value of the first status bit is different than the received value of the second status bit.

4. The method of claim 1 wherein communicating a request to store the first data at the first record further comprises communicating the request to store the first data at a first data portion of a plurality of data portions of the first record.

5. The method of claim 1 wherein the first memory write request further comprises a request to store the first data at a first address of the volatile memory and further comprising storing the first address at the first record.

6. The method of claim 1, further comprising:
 storing the first data at a first portion of the first record;
 receiving a second memory write request to write second data to the volatile memory location, the second request after the first;
 in response to receiving the second memory write request, determining if a second portion of the first record is available to store the second data.

7. The method of claim 6, further comprising:
 in response to determining the second portion of the first record is available to store the second data:
  storing a third status bit at the first record of a non-volatile memory at a fourth time;
  storing the second data at the first record at a fifth time, the fifth time after the fourth time; and
  storing a fourth status bit at the first record of a non-volatile memory at a sixth time, the sixth time after the fifth time.

8. The method of claim 7, further comprising:
 receiving a read request associated with the first record after receiving the second memory write request; and
 determining if data stored at the first record corresponds to data stored at the volatile memory location based on the first status bit and the second status bit.

9. The method of claim 8, further comprising determining if data stored at the first record corresponds to data stored at the volatile memory location based on the third status bit and the fourth status bit.

10. The method of claim 9, wherein determining if data stored at the first record corresponds to data stored at the volatile memory location comprises determining that data stored at the second portion does not correspond to data stored at the volatile memory location in response to determining that a value of the third status bit is different than a value of the fourth status bit.

11. The method of claim 1, further comprising:
 in response to receiving a request to erase the first record, storing a third status bit at the record.

12. A method comprising:
 receiving a first memory write request at a volatile memory comprising first data;
 in response to receiving the first memory write request:
  storing a first status bit at a first record of a non-volatile memory at a first time;
  storing the first data at the first record of the non-volatile memory at a second time, the second time after the first time;
  storing a second status bit at the first record of the non-volatile memory at a third time, the third time after the second time; and
 in response to a read request, reading contents of the first record, wherein reading comprises determining validity of data stored at the first record based on a received value of the first status bit and a received value of the second status bit.

13. The method of claim 12 further comprising:
receiving a second memory write request at the volatile memory comprising second data;
in response to receiving the second memory write request:
storing a third status bit at the first record of a non-volatile memory at a fourth time;
storing the second data at the first record of the non-volatile memory at a fifth time, the fifth time after the fourth time; and
storing a fourth status bit at the first record of the non-volatile memory at a sixth time, the sixth time after the second time.

14. The method of claim 12, wherein determining the validity of data comprises determining data is invalid in response to determining the received value of the first status bit is different from the received value of the second status bit.

15. The method of claim 12, further comprising storing the first data at the volatile memory in response to the first memory write request.

16. A device comprising:
a volatile memory comprising a first memory location;
a non-volatile memory including a first record operable to receive information, the record including a first location, a second location, and a third location;
a control module coupled to the non-volatile memory and the volatile memory;
in response to a write request, the control module operable to store a first status bit at the first location at a first time, store first data at the third location at a second time, the second time after the first time; and store a second status bit at the second location at a third time, the third time after the second time.

17. The device of claim 16, wherein the control module is further operable to determine validity of data stored at the first record based on a value of the first status bit and a value of the second status bit in response to a read request.

18. The device of claim 17, wherein the control module is configured to indicate a storage error to a processor device in response to determining the data stored at the first record is invalid.

19. The device of claim 17, wherein the control module is operable to determine the data stored at the first record is invalid in response to determining the value of the first status bit is different from the value of the second status bit.

20. The device of claim 16 wherein the control module is further operable to store the first data information at the volatile memory in response to the first write request.

* * * * *